United States Patent

Huetten

[15] 3,697,965

[45] Oct. 10, 1972

[54] MAGNETIC DISC HEAD ASSEMBLY

[72] Inventor: Clarence Huetten, Woodland Hills, Calif.

[73] Assignee: Sperry Rand Corporation, New York, N.Y.

[22] Filed: July 10, 1970

[21] Appl. No.: 53,828

[52] U.S. Cl. ....................340/174.1 E, 179/100.2 P

[51] Int. Cl. ....................G11b 5/60

[58] Field of Search ...........179/100.2 P; 340/174.1 E

[56] References Cited

UNITED STATES PATENTS

| | | | |
|---|---|---|---|
| 3,310,792 | 3/1967 | Groom et al. | 179/100.2 P |
| 2,763,729 | 9/1956 | Camras | 179/100.2 C |
| 3,202,772 | 8/1965 | Thomas | 179/100.2 P |

*Primary Examiner*—Bernard Konick
*Assistant Examiner*—J. Russell Goudeau
*Attorney*—Charles C. English, Sheldon Kapustin and William E. Cleaver

[57] ABSTRACT

A magnetic head assembly suitable for use in high density magnetic disc data storage systems. The head assembly includes a pad adapted to fly close to the disc surface on an air bearing having a thickness on the order to 100 microinches. The pad is carried by a spring gimbal which exhibits rotary compliance about perpendicular longitudinal and lateral axes to permit the pad to follow the disc terrain. The spring gimbal comprises an open substantially rectangular frame formed of thin spring stock. The gimbal frame is cantilevered about one of its short sides from a positioner arm mounted for radial movement with respect to a disc surface. The pad is carried by a pair of reverse cantilevered arms forming part of the gimbal frame and extending perpendicularly from the free short side thereof. A pivot bearing is provided to resiliently bear against the pad to urge it toward the disc surface only when the pad is intended to be in flying position.

10 Claims, 7 Drawing Figures

INVENTOR
CLARENCE HUETTEN
BY
Lindenberg, Freilich & Wasserman
ATTORNEYS

INVENTOR
CLARENCE HUETTEN
BY
Lindenberg, Freilich & Wasserman
ATTORNEYS

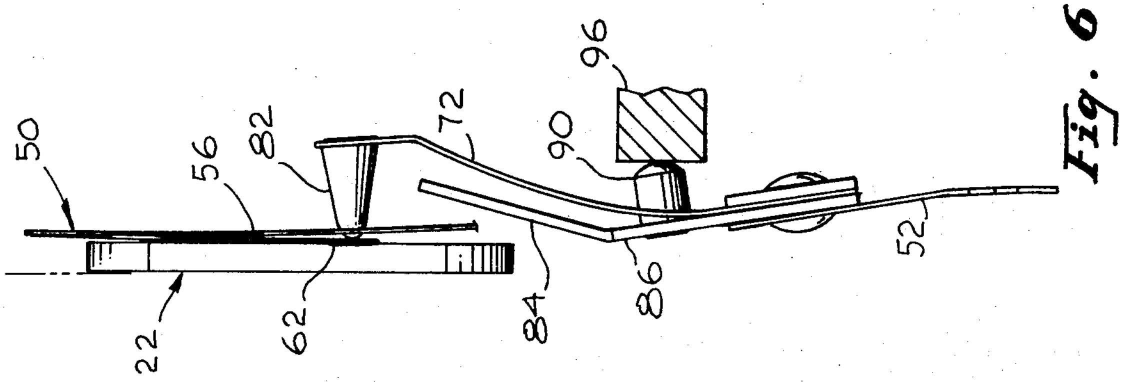
Fig. 6
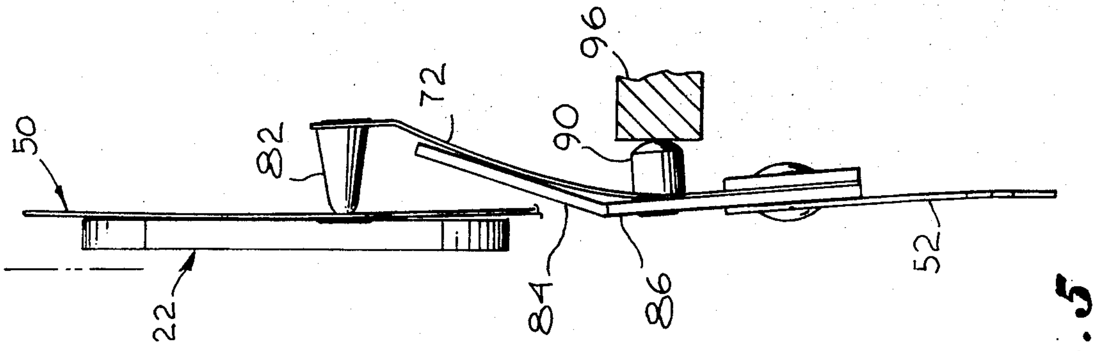
Fig. 5
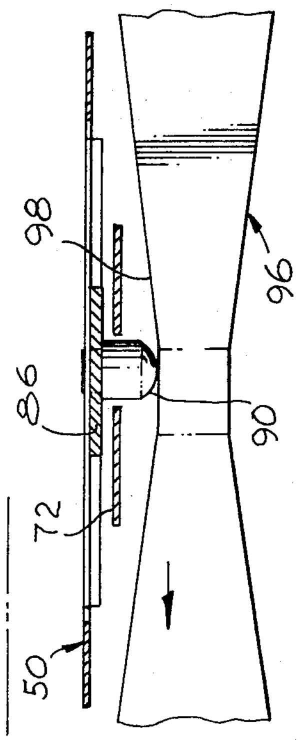
Fig. 4 (6)
INVENTOR
CLARENCE HUETTEN
BY
Lindenberg, Freilich & Wasserman
ATTORNEYS

MAGNETIC DISC HEAD ASSEMBLY

BACKGROUND OF THE INVENTION

1. FIeld of the Invention

This invention relates generally to magnetic head assemblies suitable for use in high density magnetic disc data storage systems.

2. Description of the Prior Art

The prior art is replete with various magnetic head assembly designs intended for use in magnetic disc data storage systems. Although such prior art designs function satisfactorily in many applications, the continuing objectives of providing greater storage densities and shorter access times introduces constraints which render such earlier designs unsuitable for future applications.

For example, one of the objectives of recent head assembly designs is to provide a compact structure suitable for back to back mounting on a positioner arm mounted for radial movement between a pair of closely spaced discs. Moreover, such a head assembly should be capable of being fabricated sufficiently small so that several such assemblies (e.g., four) can be mounted along the arm within the radius of the disc, e.g., 12 inches.

The foregoing objectives must, of course, be achieved in a device which allows the head carrying pad to exhibit sufficient compliance to permit it to closely fly over the disc terrain.

OBJECTS AND SUMMARY OF THE INVENTION

In accordance with the present invention, an improved magnetic head assembly is provided suitable for use in high density magnetic disc storage systems. The head assembly includes a pad adapted to fly close to the disc surface on an air bearing have a thickness on the order of 100 microinches. The pad is carried by a spring gimbal which exhibits longitudinal and lateral rotary compliance (i.e., about axes parallel and perpendicular to a disc radius, respectively) to permit the pad to follow the disc terrain.

In accordance with a significant aspect of the invention, the spring gimbal comprises an open substantially rectangular frame formed of thin spring stock. A first shorter side of the rectangular frame is secured to a positioner arm so as to cantilever the frame therefrom and permit it to flex around the first shorter side to exhibit rotary compliance with respect to an axis parallel to the disc radius. The gimbal frame includes a pair of reverse cantilevered arms extending perpendicularly from the second shorter side of the frame. These arms support a head carrying pad and are able to flex around the second shorter side so as to permit the angle of the pad to be maintained constant with varying displacements for the disc surface.

In accordance with another significant aspect of the invention, a pivot bearing is provided adapted to selectively bear against the pad to urge it toward the disc surface. The pivot bearing is mounted on a spring which urges the pivot bearing against the pad when the head is intended to be in flying position. A stop is provided which prevents spring urging of the pivot bearing against the pad when the pad is intended to be retracted, i.e., in non-flying position.

In accordance with a still further aspect of the invention, the orientation of both the gimbal frame and the stop are controlled by a cam rod engaging a button mounted on the stop. More particularly, in order to fly the head, the cam rod is moved so as to cause a cam surface thereon to bear against the button and rotate the gimbal frame about its secured shorter side. Further cam rod movement forces the stop away from the pivot bearing spring so that with very little deflection, the full spring force is exerted on the pivot bearing.

In accordance with a still further aspect of the invention, the head is provided with both a read/write gap and an erase gap. Although the gap widths (i.e., in a direction parallel to a disc radius) are preferably the same, the erase gap is given a greater length (i.e., in a direction perpendicular to the disc radius) to increase the flux at the gap fringes for the purpose of erasing a wider track than is written.

The novel features of the invention are set forth with particularity in the appended claims. The invention will be best understood from the following description when read in conjunction with the accompanying drawings.

BRIEF DESCRIPTION OF THE DRAWINGS

FIG. 4(*b*) is a sectional view taken substantially along the plane 4(*b*)–4(*b*) of FIG. 3 showing the head assembly in retracted position;

FIG. 5 is a side sectional view similar to that of FIG. 4(*a*) except however the head assembly is shown in a position intermediate the retracted position and the flying position; and FIG. 6 is a side-sectional view, similar to FIG. 4(*a*), except however, the head assembly is shown in flying position.

DESCRIPTION OF THE PREFERRED EMBODIMENTS

Figure 1:
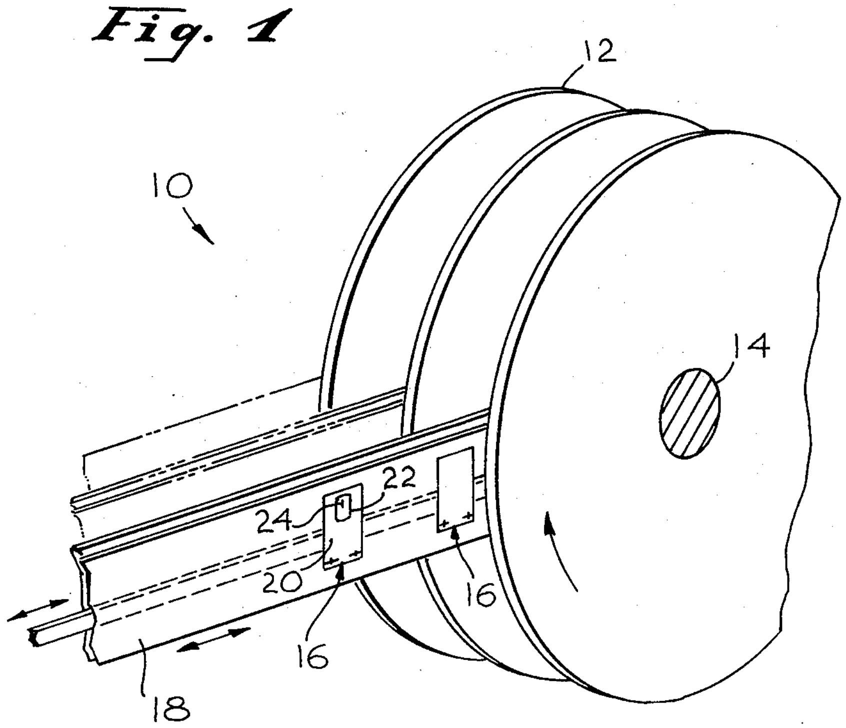
FIG. 1 is a perspective view illustrating a portion of a magnetic disc storage system including magnetic discs, a positioner arm, and head assemblies, in accordance with the invention, carried by the positioner arm.

Attention is now called to FIG. 1 which illustrates a portion of a magnetic disc data storage system 10 which can advantageously employ the head assembly in accordance with the present invention. The system 10 of FIG. 1 includes a plurality of discs 12 all mounted for rotation on a common hub 14. Both surfaces of each disc 12 are normally coated with suitable magnetic recording material. Typically, each disc 12 may have a 12 inch radius and it may be desired, for example, to define on the order of 400 tracks on each disc surface. Because of the great number of heads which would be required in such a system if a separate head were provided for each track, most large magnetic disc storage systems employ a considerably fewer number of heads per surface than there are tracks. Thus, a typical system defining 400 tracks per disc surface may, for example, be provided with only four magnetic head assemblies per surface. Where fewer head assemblies and tracks are provided, it is of course necessary to mount the head assemblies on some type of positioner arm in order to be able to selectively position a head over a desired track for reading or writing.

FIG. 1 generally illustrates a plurality of head assemblies 16 mounted on a positioner arm 18 adapted to be moved linearly along the radius of a disc for positioning the head assembly 16 over a desired disc track. The positioner arm 18 illustrated in FIG. 1 typically comprises one of a plurality of such arms secured to a comb assembly mounted for radial movement with respect to the stack of discs. Each positioner arm 18 linearly moves between the pair of adjacent discs and preferably therefore, each arm 18 carries head assemblies for operating on two opposed disc surfaces. In order to minimize the floor space required for the data storage system, it is desirable to be able to place the discs as close together as possible consistent with satisfactory performance characteristics. Thus, it is important that the head assembly 16 be compactly constructed in order to minimize disc spacing and maximize the number of head assemblies which can be carried on a positioner arm 18.

Prior to considering the details of the head assembly in accordance with the present invention, it is pointed out that the head assembly is generally comprised of a spring gimbal 20 for supporting a head carrying pad 22. In order to maximize the bit recording densities, it is necessary to minimize the spacing between the head carrying pad 22 and the disc surface. In order to do this, it has become common practice in the art to support the pad so as to enable it to float or fly on a thin air bearing (e.g., on the order of 100 microinches) created by the rapid rotation of the discs. In order to enable the pad to fly this close to the disc surface, it is important to mount the pad in a manner which enables it to exhibit sufficient rotary compliance to allow it to follow the disc terrain without crashing. That is, although extreme care is usually taken to assure that the disc surface is perfectly flat, as a practical matter, all disc surfaces will be somewhat uneven based on resolutions on the order of microinches. Thus, it can be considered that the pad 22 is called upon to fly over hills and valleys and in order to enable it to do this without crashing, the pad must be supported so as to exhibit longitudinal rotary compliance, i.e., about an axis parallel to a disc radius. Also, in order to enable the positioner arms to be rapidly repositioned along a disc radius, it is also necessary that the pad 22 be able to exhibit lateral rotary compliance, i.e., about an axis extending perpendicular to the disc radius. As will be seen hereinafter, these two degrees of rotary compliance are provided by the spring gimbal 20 which supports the pad 22.

FIG. 1 illustrates an opening 24 formed in the pad 22. This opening 24 is shown greatly enlarged in FIG. 2. Positioned behind the pad 22 (i.e., on the side of the pad 22 remote from the recording surface) is a core structure which defines both a read/write gap and an erase gap. More particularly, a pair of spaced pole pieces 26 and 28 are positioned behind the pad 22 in alignment with the opening 24. The spaced pole pieces 26 and 28 define a gap 30 therebetween having a relatively short length dimension (i.e., in a direction perpendicular to the disc radius) and a relatively long width dimension (i.e., in a direction parallel to a disc radius). For example only, the length of the read/write gap represented in FIG. 2 may be on the order of 100 microinches while the width which corresponds to and defines the width of a disc track, is much larger.

Figure 2:
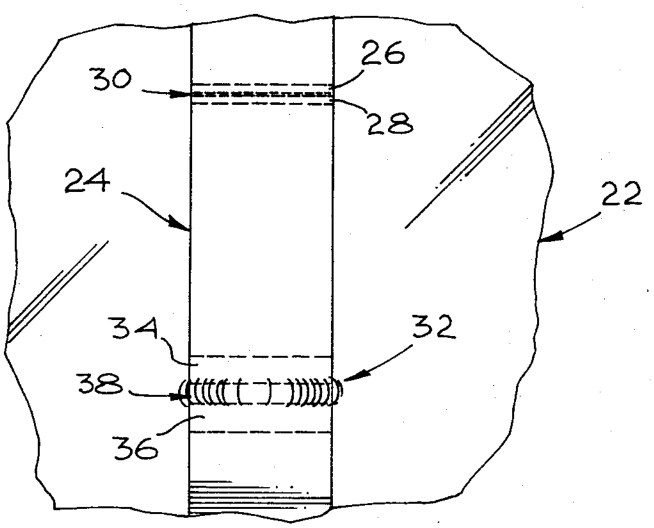
FIG. 2 is an enlarged fragmentary plan view illustrating the relationship between the head read/write and erase gaps in accordance with the present invention.

An erase gap 32 is defined by spaced pole pieces 34 and 36 which comprise part of the core structure carried by the pad 22 on the surface thereof remote from the disc surface with which the pad 22 cooperates. It is to be noted that the erase gap 32 is positioned in advance of the read/write gap 30 in the direction of movement of the disc 12. That is, a unit storage area on the disc 12 will pass the erase gap 32 prior to passing the read/write gap 30. Thus, areas of the disc surface can be erased prior to recording thereon. The width of the erase gap 32 shown in FIG. 2 is equal to the width of the read/write gap 30. However, in accordance with a feature of the present invention, the length of the gap 32 is selected so as to be considerably larger than the length of the gap 30. For example, the length of gap 32 may be selected to be 1,000 microinches if the length of gap 30 is selected to be 100 microinches. A longer erase gap length is selected in order to produce the fringing flux effect shown at 38 in FIG. 2. More particularly, the flux across the gap 32 will extend beyond the fringes of the gap width so as to thereby cause the erase head (i.e., essentially comprised of gap 32 and pole pieces 34 and 36) to erase a wider track than is recorded by the read/write head (essentially comprised of gap 30 and pole pieces 26 and 28). It should be appreciated that by erasing slightly wider tracks than are recorded, slight tolerances in the repeatability of the positioning of arm 18 can be tolerated.

Figure 3:
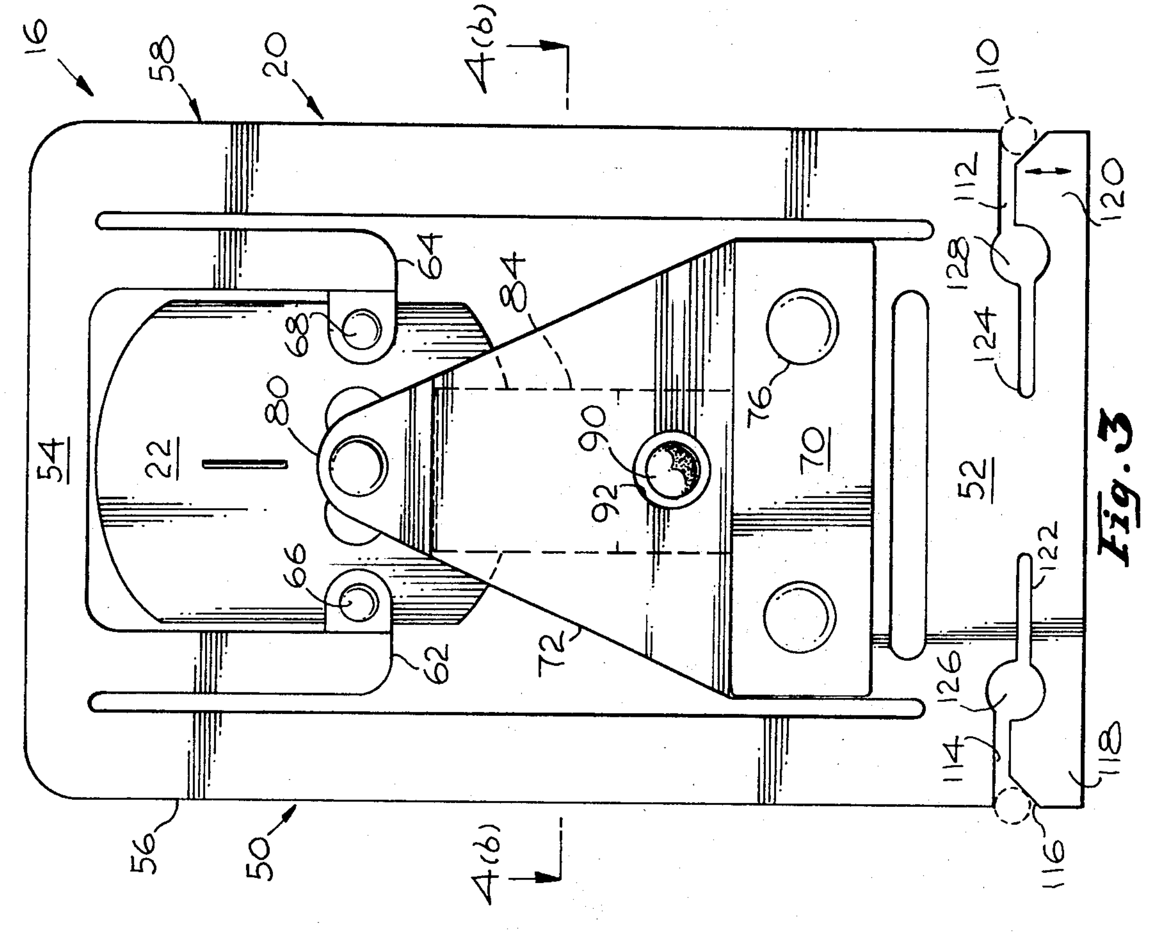
FIG. 3 is a plan view of a head assembly in accordance with the present invention.
Figure 4A:
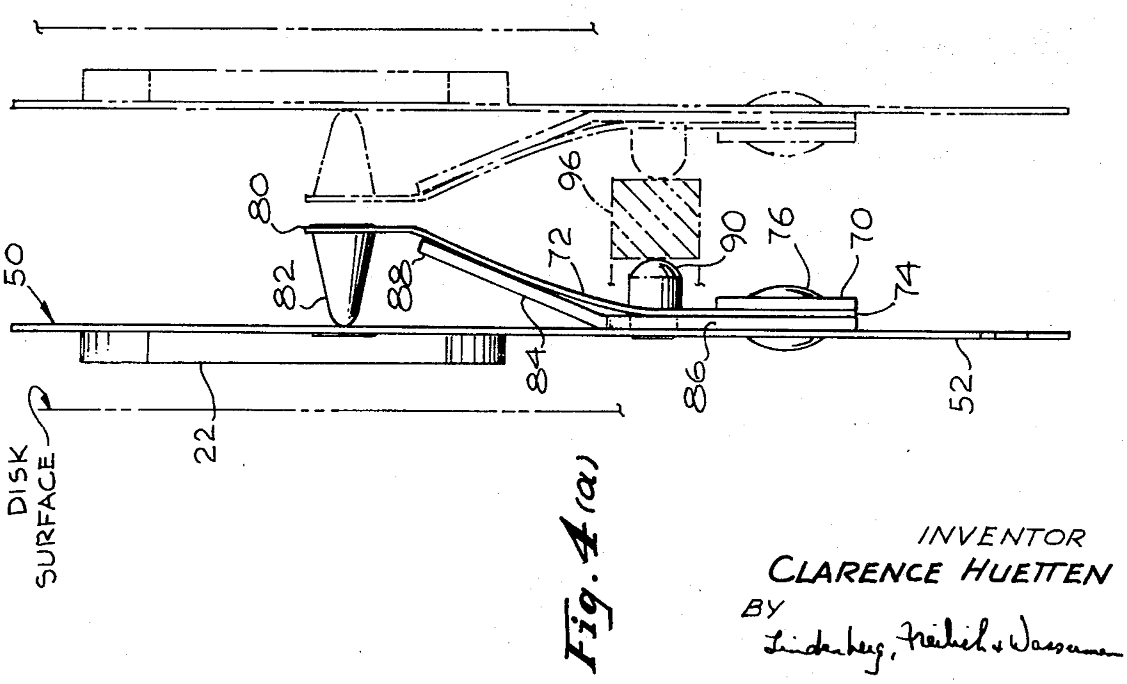
FIG. 4(*a*) is a side sectional view illustrating the head assembly in accordance with the present invention in retracted, i.e., non-flying position.

Attention is now called to FIGS. 3 and 4 which illustrate the structural detail of a magnetic head assembly 16 constructed in accordance with the present invention. As previously noted, the head assembly 16 is comprised of a spring gimbal 20 and a head carrying pad 22. More particularly, the spring gimbal 20 essentially comprises a rectangular frame 50 formed of thin spring stock. The frame 50 includes first and second shorter sides 52 and 54, respectively, and first and second longer sides 56 and 58. The shorter side 52 is intended to be fixedly secured to the positioner arm 18 with the remainder of the frame 50 being cantilevered for flexure about the side 52.

The frame longer sides 56 and 58 extend from the secured shorter side 52 to the free shorter side 54. Reverse cantilevered arms 62 and 64 extend from the free shorter side 54 toward the secured shorter side 52. The pad 22 is bonded at 66 and 68 to the ends of the reverse cantilevered arms 62 and 64.

The frame 50 is provided with a mounting bar 70 extending parallel to the shorter frame sides 52 and 54 and disposed therebetween. A spring arm 72 has a first end 74 secured to the gimbal frame mounting bar 70 preferably by a rivet 76. The second free end 80 of the spring arm carries a pivot bearing 82 positioned so as to bear against the pad 22 substantially in alignment with the bond points between the pad and the reverse cantilevered arms 62 and 64. In addition, a stop arm 84 is similarly cantilevered with respect to the frame mounting bar 70. That is, the first end 86 of the stop arm 84 is also secured to the frame mounting bar 70 by the rivet 76. The spring arm 72 is normally biased against the free end 88 of the stop arm 84.

A button 90 is secured to the stop arm 84 and projects through a hole 92 formed in the spring arm 72.

A cam rod 96 is mounted for linear movement within the positioner arm 18. The cam rod 96 is provided with a cam surface 98 adapted to engage the button 90.

FIGS. 4(*a*) and 4(*b*) illustrate the head assembly in retracted position with the pad 22 spaced by a considerable distance from the disc surface. FIG. 5 illustrates a view similar to FIG. 4(*a*) showing the head assembly in landing position with the pad, however, not yet flying. FIG. 6 is similar to FIGS. 4(*a*) and 5 but illustrates the head assembly in flying position. Movement of the head assembly from the retracted position of FIG. 4(*a*) to the landing position of FIG. 5 to the flying position of FIG. 6 is effected as a consequence of the linear movement of the cam rod 96 which causes the cam surface 98 to successively further displace the button 90 from its retracted position of FIG. 4(*a*).

More particularly, starting from the position in FIG. 4(*a*), as the cam rod 96 is moved toward the left, as viewed in FIG. 4(*b*), the button 90 is pushed upwardly and as a consequence causes the entire frame 50 to rotate or flex about the first side 52 and in so doing to move the pad 22 closer to the disc surface. The cam force on the button 90 not only flexes the frame sides 56 and 58 about the side 52 but in addition, communicates a force through the spring arm 72 and pivot bearing 82 to the pad 22 so as to flex the reverse cantilevered arms 62 and 64 about the frame side 54. As a consequence, as the pad is displaced closer to the disc surface from the retracted position shown in FIG. 4(*a*) to the landing position shown in FIG. 5, the angle between the pad and disc surface is maintained substantially constant.

FUrther linear movement of the cam rod 96 to the left, as viewed in FIG. 4(*b*), displaced the button 90 further and forces the stop arm 84 out of engagement with the spring arm 72, as illustrated in FIG. 6. As a consequence, with very little deflection of the spring arm 72, the full spring force thereof will be exerted on the pivot bearing 82 to provide the effect of a well-deflected low rate spring. That is, with the stop arm 84 forced out of engagement with the spring arm 72, the force of the spring arm 72 is fully exerted through the pivot bearing 82 which bears against the pad forcing it to fly close to the disc surface while enabling the pad to exhibit rotary compliance about two perpendicular axes within the plane of the pad and through the pivot bearing 82.

Upon withdrawal of the cam rod 96 in FIG. 4(*b*) to the right, the force on button 90 is removed permitting the spring frame 50 to return from the flying position of FIG. 6 to the retracted position of FIG. 4(*a*) and in so doing to lift the pad from the disc.

It will be appreciated that it is desirable to locate the head assemblies 16 as precisely as possible on the positioner arm 18. For this purpose, the positioner arm is provided with locating pins 110 (shown in dotted line in FIG. 3). The side 52 of the spring frame 50 is bifurcated by forming slots 112 and 114 respectively extending inwardly from the ends of the frame side 52. The entrance opening to the slots 112 and 114 is beveled as at 116 for receiving the locating pins 110. By bifurcating the side 52 as illustrated in FIG. 3, the lower portions 118 and 120 shown therein can slightly flex within the plane of the spring frame 50 about the slot end points 122 and 124, respectively. This flexure enables the spring frame to take up small tolerances associated with the dimensioning and positioning of the locating pins. Once the spring frame is properly located on the positioner arm 18, it is secured thereto by screws (not shown) which pass through the openings 126 and 128 defined within the frame side 52.

From the foregoing, it will be recognized that a head assembly has been disclosed herein suitable for use in high density magnetic disc data storage systems. Head assembly embodiments constructed in accordance with the present invention can be fabricated very compactly and yet can yield the required rotary compliance about two perpendicular axes within the plane of the head carrying pad in order to enable the pad to fly closely over the disc surface and follow the disc terrain.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A head assembly suitable for use in a data storage system including a mounting arm positioned adjacent to a flat movable recording surface, said assembly comprising:

substantially rectangular frame formed of thin spring stock and having a first side thereof adapted to be secured to said mounting arm so as to cantilever said frame about said first side;

said frame including first and second arms cantilevered from a second side of said frame, opposite to said first side, and extending toward said frame first side;

a pad secured between the free ends of said first and second arms; and means susceptible to a force applied perpendicular to the plane of said frame for rotating said frame about said first frame side and said first and second arms about said second frame side for maintaining the angle of said pad substantially constant as the displacement between said pad and a fixed plane parallel thereto is varied in response to the application of said force;

said means susceptible to a force including a mounting bar on said frame extending substantially parallel to said first and second frame sides and disposed therebetween;

a stop arm cantilevered from said mounting bar extending toward said second frame side;

a spring arm cantilevered from said mounting bar extending toward said second frame side and biased against said stop arm; and a pivot bearing carried by said spring arm and positioned so as to engage said pad.

2. The head assembly of claim 1 including a button mounted on said stop arm; and means for applying a force to said button for rotating said frame about said first frame side and said first and second arms about said second frame side.

3. The head assembly of claim 2 including a hole defined in said spring arm; and wherein said button mounted on said stop arm projects through said hole defined in said spring arm.

4. The head assembly of claim 3 wherein said means for applying a force includes a cam means mounted for movement relative to said button and having a cam surface for bearing against said button for rotating said frame about said first frame side in response to an initial movement of said cam means and for moving said stop arm away from said spring arm in response to a further movement of said cam means.

5. The head assembly of claim 1 wherein said first frame side is bifurcated to define first and second branches capable of exhibiting resilient movement with respect to each other in the plane of said frame.

6. An assembly exhibiting rotary compliance about first and second perpendicular axes and useful for supporting a pad intended to fly close to a moving recording surface, said assembly comprising:

a substantially rectangular frame formed of thin spring stock having a pair of longer sides and a pair of shorter sides;

means cantilevering said frame about a first of said shorter sides thereof;

said frame including first and second arms projecting from said second shorter side toward said first shorter side;

means supporting said pad between the free ends of said first and second arms;

said frame further including a spring mounting bar formed therewith extending parallel to said shorter sides and disposed therebetween;

a spring arm cantilevered about a first end secured to said spring mounting bar; and a pivot bearing secured to the second end of said spring arm for bearing against said pad.

7. The assembly of claim 6 including a substantially rigid arm cantilevered about a first end secured to said spring mounting bar and bearing against said spring arm for normally spacing said pivot bearing from said pad; and means for disengaging said stop arm from said spring arm to permit said spring arm to resiliently urge said pivot bearing against said pad.

8. The assembly of claim 7 wherein said means for disengaging includes a button secured to said stop arm projecting through a hole defined in said spring arm.

9. The assembly of claim 8 including cam means mounted for movement relative to said button and having a cam surface for bearing against said button for rotating said frame about said first frame side in response to an initial movement of said cam means and for moving said stop arm away from said spring arm in response to a further movement of said cam means.

10. The head assembly of claim 6 including first and second pairs of pole pieces carried by said pad;

said pole pieces of said first pair being spaced to define a gap having a certain length extending in the direction of movement of said recording surface and a certain width extending perpendicular thereto;

said pole pieces of said second pair being spaced to define a gap having a width equal to the width of the gap defined by the pole pieces of said first pair and a length significantly greater than the length of the gap defined by the pole pieces of said first pair to produce flux between the pole pieces of said second pair extending beyond the fringes of the gap defined therebetween.

* * * * *